United States Patent
Gunnarsson et al.

(10) Patent No.: US 6,493,541 B1
(45) Date of Patent: Dec. 10, 2002

(54) TRANSMIT POWER CONTROL TIME DELAY COMPENSATION IN A WIRELESS COMMUNICATIONS SYSTEM

(75) Inventors: Fredrik Gunnarsson, Linköping (SE); Niclas Wiberg, Linköping (SE); Fredrik Gustafsson, Ljungsbro (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/346,316

(22) Filed: Jul. 2, 1999

(51) Int. Cl.[7] .................................................. H04B 1/00
(52) U.S. Cl. ........................ 455/69; 455/522; 375/346
(58) Field of Search ........................... 455/69, 522, 63, 455/67.1, 67.3; 375/346

(56) References Cited

U.S. PATENT DOCUMENTS

| | | | |
|---|---|---|---|
| 4,485,486 A | | 11/1984 | Webb et al. |
| 5,241,690 A | * | 8/1993 | Larsson et al. ............ 455/54.1 |
| 5,305,468 A | | 4/1994 | Bruckert et al. |
| 5,574,982 A | | 11/1996 | Almgren et al. |
| 5,852,782 A | * | 12/1998 | Komatsu .................... 455/522 |
| 5,881,367 A | * | 3/1999 | Calot et al. .................... 455/69 |
| 5,924,043 A | * | 7/1999 | Takano ........................ 455/522 |
| 6,138,033 A | * | 10/2000 | Kitade et al. ............... 455/522 |
| 6,292,519 B1 | * | 9/2001 | Popovic ....................... 375/346 |
| 6,341,225 B1 | * | 1/2002 | Blanc ........................... 455/522 |
| 6,373,823 B1 | * | 4/2002 | Chen et al. .................. 370/252 |

OTHER PUBLICATIONS

Licenciate Thesis, Linköpings universitet, Sweden, Jun. 1998, J. Blom and F. Gunnarsson, "Power Control in Cellular Radio Systems," available at http://www.control.i-sy.kiu.se/~fred/Publ/Lic706.pdf.

Proc. IEEE Vehicular Technology Conference, Stockholm, Sweden, Jun. 1994, pp. 833–837, Magnus Almgren et al., "Power Control in a Cellular System".

(List continued on next page.)

Primary Examiner—Nguyen T. Vo
Assistant Examiner—Nghi H. Ly
(74) Attorney, Agent, or Firm—Nixon & Vanderhye, P.C.

(57) ABSTRACT

The present invention compensates for transmit power control time delays between a radio transmitter and receiver that adversely affect the transmit power control process. A time delay associated with a power control loop is compensated for by adjusting a detected signal quality value of a received signal, e.g., signal-to-interference ratio (SIR), based on one or more previous power control commands already sent but whose effect has not yet been experienced. Because the determined signal quality value of the received signal is adjusted based on one or more power control commands already sent but yet to take effect, the transmit power level control command is appropriately determined so that it also takes into account a power control loop time delay. The delay compensation value may be determined based on the output power of a single, previously generated transmit power control command, or on plural previously generated transmit power control commands, depending upon the length of the time delay. If the adjusted signal quality parameter exceeds the target signal quality parameter, the generated power control command directs a decrease in transmit power, and the compensation factor causes a decrease in the subsequently determined signal quality parameter. If the adjusted signal quality parameter is less than the target signal quality parameter, the generated power control command directs an increase in transmit power, and the compensation factor causes an increase in the subsequently determined signal quality parameter.

42 Claims, 9 Drawing Sheets

OTHER PUBLICATIONS

*COMSAT Technical Review*, vol. 3, No. 2, Fall 1973, pp. 277–299, J.M. Aein, "Power balancing in systems employing frequency reuse".

*IEEE Transactions on Communications*, vol. 42, No. 2/3/4, Feb./Mar./Apr. 1994, pp. 597–605, Sirikiat Ariyavisitakul, "Signal Interference Statistics of a CDMA System with Feedback Power Control—Part II".

*IEEE Transactions on Vehicular Technology*, vol. 42, No. 4, Nov. 1993, pp. 541–546, Gerard J. Foschini et al., "A Simple Distributed Autonomous Power Control Algorithm and its Convergence".

*IEEE Transactions on Vehicular Technology*, vol. 41, No. 1, Feb. 1992, pp. 57–62, Jens Zander, "Performance of Optimum Transmitter Power Control in Cellular Radio Systems".

*Proc. IEEE Global Telecommunications Conference*, Sydney, Australia, Nov. 1998, F. Gunnarsson et al., "Power Control in Cellular Systems Subject to Constraints and Time Delays".

U.S. patent application Ser. No. 09/031,635 filed Feb. 27, 1999.

* cited by examiner

TRANSMIT POWER CONTROL TIME DELAY COMPENSATION IN A WIRELESS COMMUNICATIONS SYSTEM

FIELD OF THE INVENTION

The present invention relates to wireless communications, and more specifically, to radio transmit power control in a mobile radio communications system.

BACKGROUND AND SUMMARY OF THE INVENTION

In cellular communications systems, the mobile radio station communicates over an assigned radio channel with a radio base station. Several base stations are coupled to a switching node which is typically connected to a gateway that interfaces the cellular communications system with other communication systems. A call placed from an external network to a mobile station is directed to the gateway, and from the gateway through one or more switching nodes to a base station which serves the called mobile station. The base station pages the called mobile station and establishes a radio communications channel. A call originated by the mobile station follows a similar path in the opposite direction.

Due to the rapid expansion of wireless mobile communications and the need for wideband multimedia services, there is a continuing need to better utilize the available frequency bandwidth. A common strategy in Frequency Division Multiple Access (FDMA)/Time Division Multiple Access (TDMA) systems is to reuse the frequencies in the network. The challenge with frequency reuse is to counteract or at least reduce the interference between transmitters in the system using the same frequency by controlling the transmit power levels of the radio signals and by separating to the extent practical the transmitters by a sufficient geographic distance. The radio transmit power levels of the mobile stations and base stations are ideally lowered so that only the minimum transmission power necessary to maintain satisfactory call quality is used. By reducing mobile and base station transmission power, the other radio communicators experience lower interference which means that the system capacity can be increased. The capacity of a transmission power regulated system can arguably be increased by approximately 70% compared to an unregulated system. Another reason to maintain lower transmit power levels, at least for battery-operated mobile stations, is to reduce the energy consumed by mobile stations during transmissions.

In a Code Division Multiple Access (CDMA) mobile communication system, spreading codes are used to distinguish information associated with different mobile stations or base stations transmitting over the same radio frequency band-hence the term "spread spectrum." In other words, individual radio "channels" are discriminated upon the basis of these codes. Various aspects of CDMA are set forth in textbooks such as *Applications of CDMA and Wireless/Personal Communications*, GARG, Vijay K. et al, Prentice-Hall 1997.

Spread spectrum communications permit mobile transmitted signals to be received at two or more "diverse" base stations and processed simultaneously to generate one received signal. With these combined signal processing capabilities, it is possible to perform a handover from one base station to another, (or from one antenna sector to another antenna sector connected to the same base station), without any perceptible disturbance in the voice or data communication. This kind of handover is typically called diversity handover and includes both soft and softer diversity handover.

Because all users of a CDMA communications system transmit information using the same frequency band at the same time, each user's communication interferes with the communications of the other users. In addition, signals received by a base station from a mobile station close to the base station are much stronger than signals received from other mobile stations located at the base station's cell boundary. As a result, distant mobile communications are overshadowed and dominated by close-in mobile stations which is why this condition is sometimes referred to as the "near-far effect."

Interference is therefore a particularly severe problem in CDMA systems. If one mobile station transmits at a power output that is too large, the interference it creates degrades the signal-to-interference ratio (SIR) of signals received from other mobile radios to the point that a receiving base station cannot correctly demodulate transmissions from the other mobile radios. In fact, if a mobile station transmits a signal at twice the power level needed for the signal to be accurately received at the base station receiver, that mobile's signal occupies roughly twice the system capacity as it would if the signal were transmit at the optimum power level. Unregulated, it is not uncommon for a "strong" mobile station to transmit signals that are received at the base station at many, many times the strength of other mobile transmissions. Such a loss of system capacity to excessively "strong" mobile stations is unacceptable.

Additional problems are associated with excessive transmit power. One is the so-called "party effect." If a mobile transmits at too high of a power level, the other mobiles may increase their respective power levels so that they can "be heard" compounding the already serious interference problem. Another problem is wasted battery power. It is very important to conserve the limited battery life in mobile radios. The major drain on a mobile's battery occurs during transmission. Thus, a significant objective for any power control approach, therefore, is to reduce transmit power where possible. Except for battery consumption, the above-described problems with setting transmission power also apply to downlink radio transmissions from base stations to mobile stations.

In some mobile radio communications systems, power regulation is performed relatively infrequently being based on the unrealistic assumption that the disturbance level is more or less constant. The mobile's transmission power is only coarsely controlled, with the objective being to maintain the received desired signal level over the interference level. In practice, however, radio conditions and interference levels vary considerably with both time and place so that infrequent power regulation is not optimal.

One common approach to power control is to try and balance the transmit power level of signals on each radio channel so that all mobile stations or base stations receive signals with the same Signal-to-Inference Ratio (SIR). For every traffic scenario, there is a maximum SIR that can be obtained at all radio receivers at the same time. Ideally, if all information is available at one location, a global or centralized power control scheme may be employed to determine and assign the various necessary transmission powers so this maximum is achieved. But this approach requires extensive overhead signaling to keep the centralized intelligence entity fully informed and up to date. Another approach, less onerous at least with respect to control signaling, is to perform power control in a distributed fashion using only local SIR type measurements.

In both approaches, the appropriate target SIR must first be determined. If the SIR target value is set too high, the radio transmit powers might be increased to maximum levels determined by the physical limits of the system without achieving the specified SIR target value. Should that be the case, "graceful degradation" by uniformly reducing transmit power levels of all active radios can be employed to minimize the impact on the quality of service provided.

A significant goal for most if not all radio transmit power control procedures is to keep the signal strength and/or quality of the signal detected by a receiver above a threshold without using unnecessarily high transmit power. In contrast to infrequent power regulation schemes mentioned above, most CDMA-based systems employ a relatively high sampling rate for the power control algorithm, e.g., 1600 times per second. To minimize overhead control signaling, only one bit is used to communicate power control adjustments to the radio transmitter.

In the IS-95 CDMA standard and similar systems, the power is stepwise increased or decreased based upon a comparison of the received signal strength or other signal parameter like SIR with a threshold. The receiver controls the transmitter's power by issuing power control commands—power up or power down—at the same high sampling rate based on measurements of a signal-to-interference ratio. If the measured signal parameter value is less than a target signal parameter value, the power up command is issued; otherwise, the power down command is issued. The radio transmitter responds to the power control commands by increasing or decreasing its transmit output power level P, for example, by a certain incremental power step $\Delta$, i.e., $P \leftarrow P+\Delta$ or $P \leftarrow P-\Delta$.

At the example sampling rate noted above, either a power up or a power down command issues every 0.625 msec. As a result, the transmit power level is never perfectly constant or static. Accordingly, even in an ideal radio environment, the incremental power control commands continually alternate between power up and power down so that the transmit power level and the received signal quality oscillate up and down an incremental step around a target value. In order to maintain the quality of the received signal always above a prescribed limit, the target value needs to be set slightly higher than that limit so that the received signal quality after the power down step is still above the prescribed limit.

There is a problem with this type of power control algorithm, namely, the sometimes considerable delay between the time a transmit power control command is issued by a radio receiving and evaluating the signal quality of the received signal and the time when the effect on the transmit power level of the transmitting radio is experienced. This delay is referred to generally below as "power control delay" and can include a total time delay period or some portion thereof.

Indeed, if the delay between the issuance of the command and its effect is larger than the time intervals separating issuance of two consecutive power control commands, the transmit power level will be increased or decreased more than it should or otherwise needs to be. For example, if the receiver determines that a received signal is below a target SIR value, a power up command is issued to the transmitter. However, due to the power control loop delay, the power up command does not take effect until after the radio receiver again samples the received signal quality, determines that it is still below the target value, and issues another power up command. As a result, the transmit output power level is adjusted upwards twice even though, at least in some instances, a single power up adjustment would have been sufficient. When the received signal quality is finally detected as exceeding the target value, the same over-reactive power control procedure is likely repeated with power down commands.

Such over-reactive power control is undesirable for several reasons. First, the transmit power levels have higher peaks resulting in greater interference for other users of the system. Second, the higher peak oscillations may lead to instabilities in the radio network. Third, because the oscillation peaks have a higher amplitude, the target signal quality will have to be increased so that the negative oscillation peak does not dip below the minimum desired signal quality. This results in a higher average power increasing the battery drain for mobile stations and the interference to other users.

Figure 1:
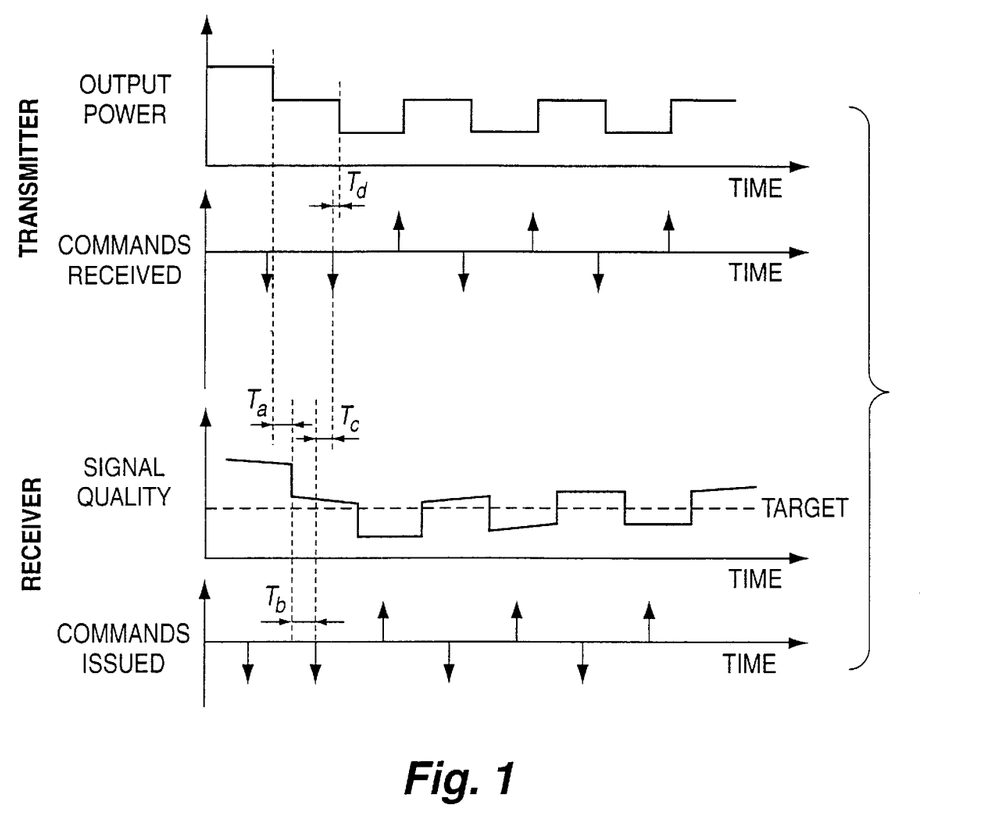
FIGS. 1 and 2 include signal graphs illustrating power control commands, received signal quality, and transmit output power levels associated with a power control loop.
Figure 2:
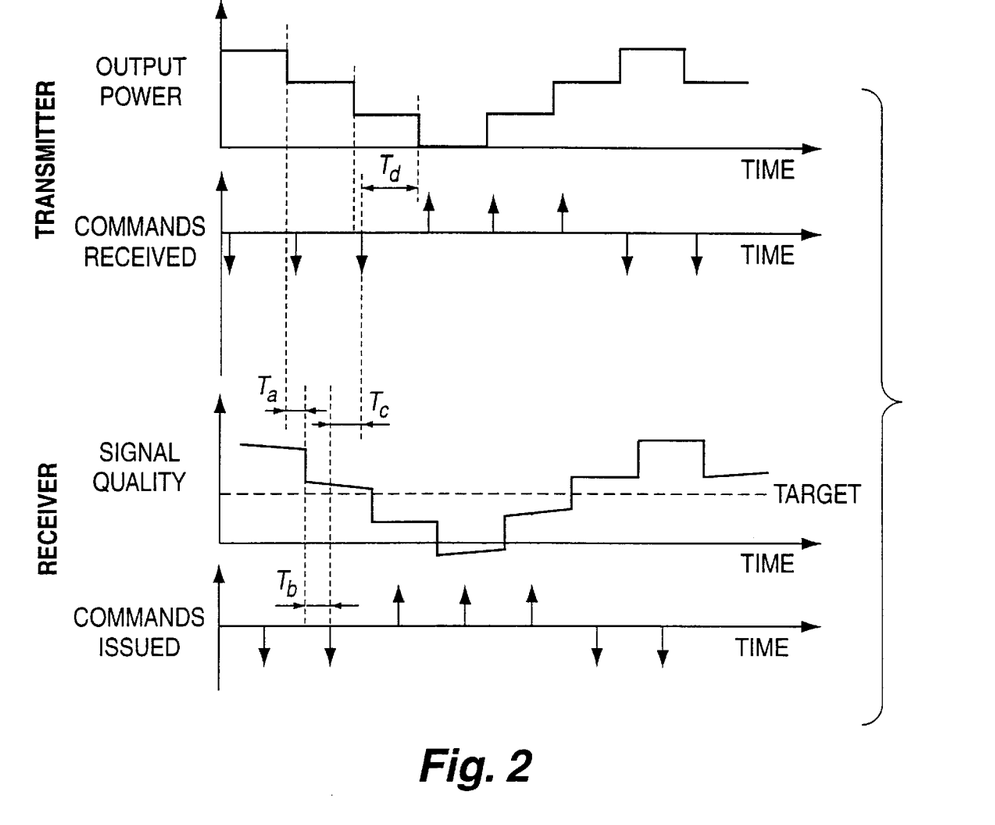

Reference is now made to FIGS. 1 and 2 which illustrate the various aspects of the power control delay characteristics described above. FIG. 1 shows two signal graphs for the transmitting station including power commands received and transmit output power level. FIG. 2 shows two signal graphs for the receiving station including detected signal quality, e.g., SIR, and power control commands issued. A power down command is first received. Shortly thereafter, the transmit output power is decremented by a predetermined $\Delta$ amount which, after time delay $T_a$ results in a reduction in the detected signal quality at the receiver. There is also a delay $T_b$ needed for the receiver to detect the current signal quality of the received signal and then issue an appropriate power control command, in this case, a power down command. Yet another delay $T_c$ is incurred from the point when the second power down command is issued until it is received at the radio transmitter. A fourth delay $T_d$ occurs between the time when the second power control command is received and then executed.

Thus, FIG. 2 shows signal graphs similar to those shown in FIG. 1, but with larger power control delays. In general, because of the larger delay, the power control algorithm overreacts causing greater oscillations in transmit power and in the received signal quality. Consider the time during $T_d$ during which the signal-to-interference ratio is measured and found to be slightly below the target signal-to-interference ratio resulting in the issuance of a power up command shortly before the expiration of time period $T_d$. For the next measurement time interval, the power up command has not yet taken effect (at the least, the receiver has not yet seen its effect), and thus the signal quality measurement still indicates that the detected SIR is below the target. Therefore, another power up command is issued. As a result, the transmit power is adjusted upwards twice when a single power up command would have been sufficient. When the received signal quality finally exceeds the target SIR, the same process is repeated with the power down commands.

Even in a static radio environment, the power control oscillation period for this kind of incremental method is six SIR measurement time intervals, including three power up and three power down control command intervals. The difference between the highest and lowest transmit output power will be three times that compared to the case where there is no delay between the time a power command is issued and the time its effect is experienced. Of course, the time delay associated problems are further exasperated with increasing delay. The larger the number of pending issued power controls commands that have not yet taken effect, the greater the oscillation, instability, interference, power consumption, etc.

These and other problems are solved by the present invention which compensates for a transmit power control time delay that adversely affects the power control process. Time delay associated with the power control loop is compensated for by adjusting a determined value of a received signal, and in particular, based on a previous power control command already sent but whose effect has not yet been experienced. Because the determined value of the received signal is adjusted using a delay compensation value, the transmit power level control command is appropriately determined so that it also takes into account the power control loop time delay. The delay compensation value may be determined based on the output power of a single, previously generated transmit power control command, or on plural previously generated transmit power control commands, depending upon the length of the time delay.

Initially, a signal quality parameter of a signal received from the transmitter is determined such as a signal interference ratio or a received signal strength. The determined signal quality parameter is adjusted using the compensation factor, and compared to a target signal quality parameter. In response to the comparison, a power control command is generated which takes into account the signal quality parameter compensation factor. The compensation factor is thereafter modified to take into account the generated power control command. The power control command may include an incremental power up as well as an incremental power down command. The incremental value may be a fixed constant or a variable. Alternatively, the power control command may be a designated transmit power value.

In any event, if the adjusted signal quality parameter exceeds the target signal quality parameter, the generated power control command directs a decrease in transmit power, and the compensation factor causes a decrease in the subsequently determined signal quality parameter. If the adjusted signal quality parameter is less than the target signal quality parameter, the generated power control command directs an increase in transmit power, and the compensation factor causes an increase in the subsequently determined signal quality parameter. As the time delay associated with the power control command decreases, the number of power control commands used to determine the compensation factor may decrease. Alternatively, as the time delay associated with the power control command increases, the number of power control commands used to determine the compensation factor tends to increase.

The present invention may be employed advantageously in a radio station for use in a mobile radio communications system. The radio station includes a transmitter for transmitting a power control command to another radio station and also includes a receiver for receiving a signal transmitted by the other radio station. A detector detects a signal quality parameter associated with the received signal. A processor predicts an effect the transmit power control command will have on the detected signal parameter. More particularly, the processor predicts the effect that the transmit power control command would have if the transmit power control command had already been received and implemented in the transmitter. Using the predicted effect, the processor adjusts the detected signal parameter, and generates the power control command based on the adjusted signal parameter. The prediction and the adjustment compensate for a time delay associated with controlling the transmit power of the radio transmitter.

The present invention can be implemented in a base station used to control a transmit power level of the radio transmitter in a mobile station. Alternatively, the invention can be implemented in a mobile station to control a transmit power level of a radio transmitter in a base station.

BRIEF DESCRIPTION OF THE DRAWINGS

The foregoing and other objects, features and advantages of the invention will be apparent from the following description of preferred embodiments, as well as illustrated in the accompanying drawings in which reference characters refer to the same parts throughout the various figures. The drawings are not necessarily to scale, emphasis instead being placed on illustrating the principles of the invention.

DETAILED DESCRIPTION OF THE DRAWINGS

In the following description, for purpose of explanation and not limitation, specific details are set forth, such as particular example embodiments, procedures, and techniques, etc., in order to provide a thorough understanding of the present invention. However, it will be apparent to one skilled in the art that the present invention may be practiced in other embodiments that depart from these specific details. For example, the present invention may be applied advantageously to control the transmit power of both mobile station transmissions and base station transmissions on uplink/reverse and downlink/forward direction radio channels. In other instances, detailed descriptions of well-known methods, interfaces, devices and signaling techniques are omitted so as not to obscure the description of the present invention with unnecessary detail.

The present invention will be described in the context of a mobile radio cellular communications system such as that indicated at reference numeral 10 in FIG. 3 which may be, for example, a CDMA or a wideband CDMA (WCDMA) mobile communications system. Radio network controllers (RNCs) 12 and 14 control various radio network functions including for example radio access bearer setup, diversity handover, etc. Radio network controller 12 is coupled to a plurality of base stations 16, 18, and 20. Radio network controller 14 is connected to base stations 22, 24, and 26. Each base station serves a geographical area referred to as a cell, and a cell may be divided into plural sectors. Base station 26 is shown as having five antenna sectors S1–S5. Each sector also has a corresponding cell area so that in this situation the base station serves five cells. The base stations are connected to their corresponding radio network controller by various means such as dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center and/or a packet radio service node (not shown). The RNC directs mobile station calls via the appropriate base station(s).

Figure 3:
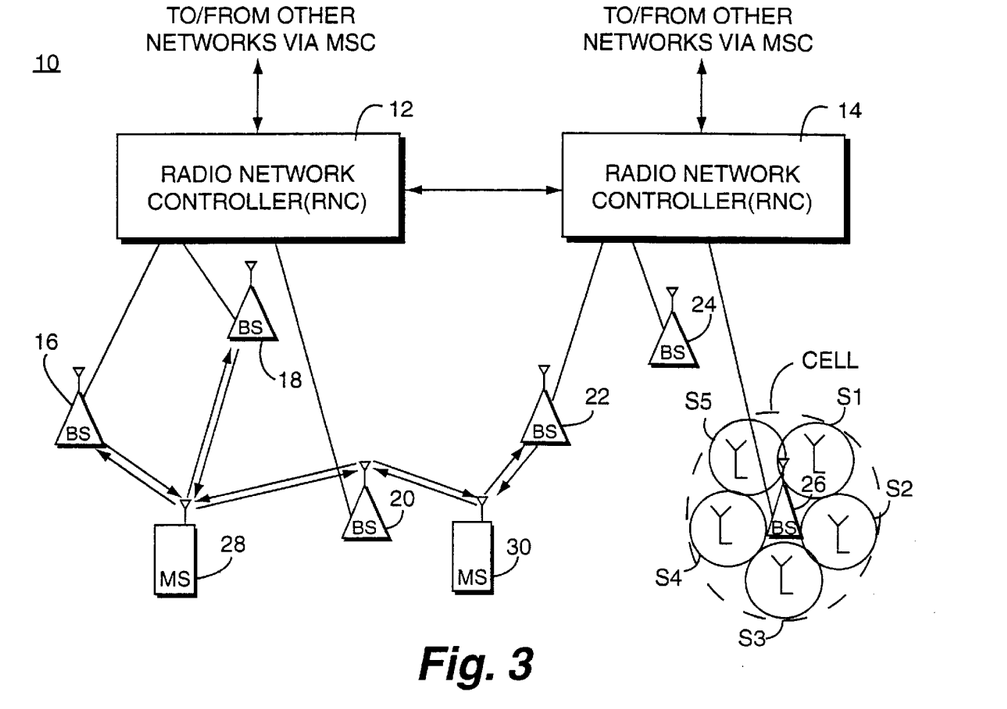
FIG. 3 is a high level diagram of an example mobile communications system in which the present invention may be employed.

In FIG. 3, two mobile stations 28 and 30 are shown communicating with plural base stations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 4:
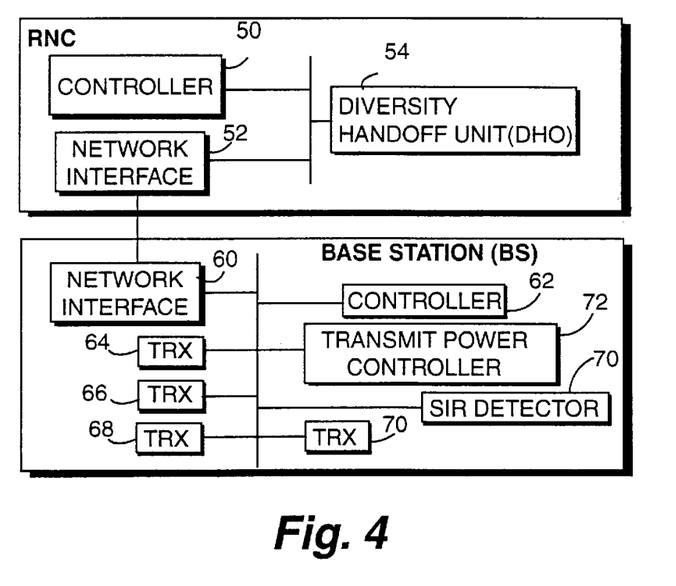
FIG. 4 is a function block diagram of a radio network controller and a base station illustrated in FIG. 3.

Additional details of a base station and a radio network controller are now provided in conjunction with FIG. 4. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs numerous functions required for establishing, maintaining, and dropping diversity connections such as diversity combining, diversity splitting, power control and other link related radio resource control algorithms. The RNC may include other control/functional units not necessary to the understanding of the invention.

Each base station includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near the base station's cell(s) monitor the common channel. Transmit power controller 72 performs power control operations. One or more signal-to-interference ratio (SIR) detectors 74 (only one is shown for purposes of illustration) may be used to detect the SIR of signals received from mobiles. As mentioned in the background, other signal quality detectors may be employed, e.g., CIR, RSSI, etc.

Figure 5:
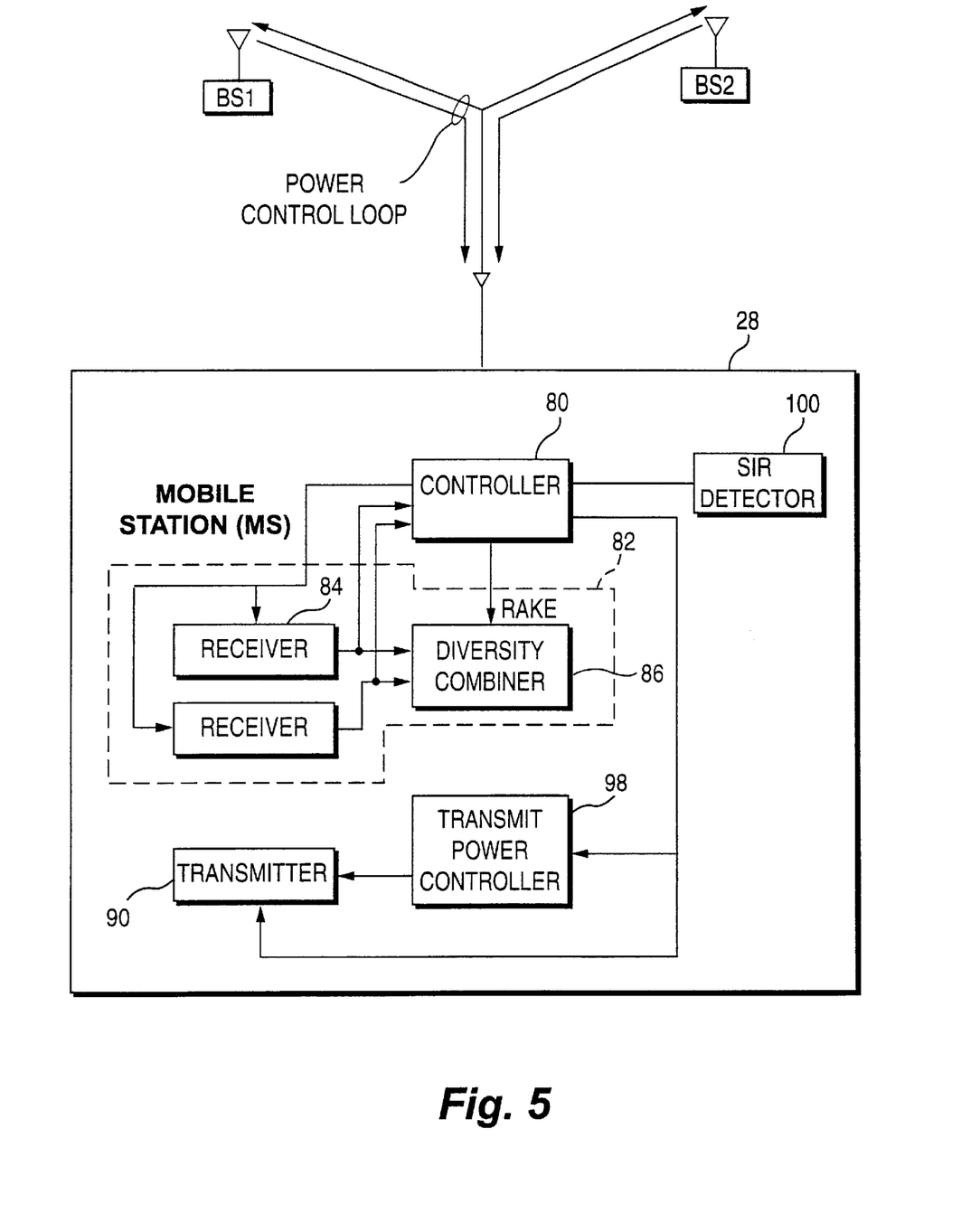
FIG. 5 is a function block diagram of a mobile station shown in FIG. 3, as well as a power control loop in an example power control scheme used in a mobile communications system.

FIG. 5 illustrates additional details of a mobile station shown in FIG. 4. The mobile station includes a controller 80 connected to a RAKE receiver 82, a transmit power controller 88, a transmitter 90, and a SIR (or other signal quality) detector 100. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combining diversity combiner 86 and processed as one signal. Transmit power controller 88 determines the transmit power level (preferably as a signal-to-interference ratio (SIR)) of the received, diversity-combined signal.

FIG. 5 also shows a power control loop between the mobile station and two base stations BS1 and BS2. Based upon SIR measurements of a received signal, the mobile station generates transmit power control commands sent to the base stations BS1 and BS2. Similarly, the base stations BS1 and BS2 send transmit power control (TPC) commands to the mobile station based on SIR measurements made of signals received from that mobile station. The TPC commands may include one or more bits which indicate a desired increase in transmit power or a desired decrease in transmit power. Of course, any number of bits or bit assignments may be used. Alternatively, an actual transmit power level value may be sent. In order to compensate for rapidly changing transmission conditions, the SIR measurements and resulting transmit power control commands are generated very frequently, and in one example embodiment, every 0.625 millisecond time slot or 1,600 times a second.

Figure 6:
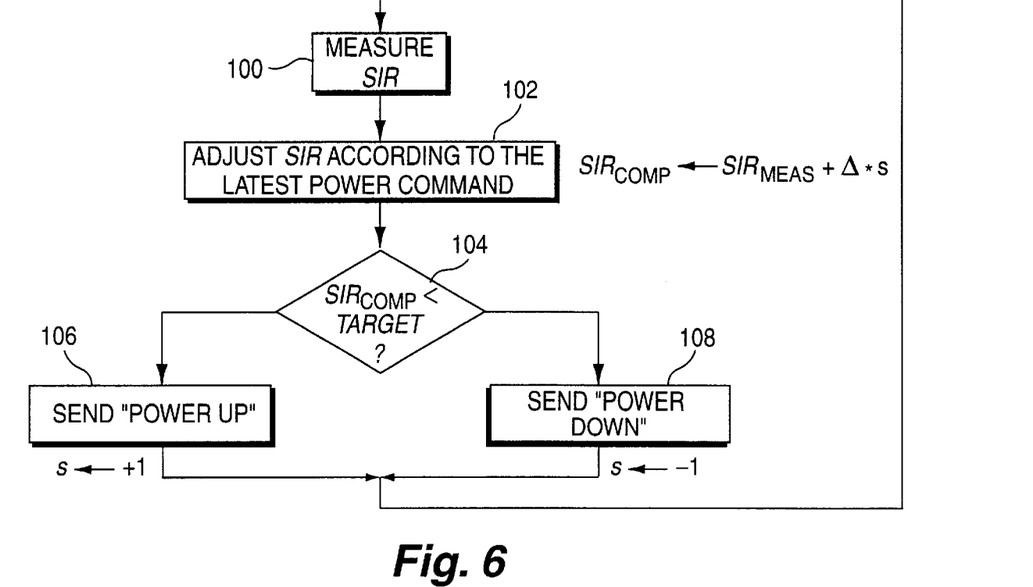
FIG. 6 illustrates a power control routine in accordance with one non-limiting, example embodiment of the present invention in flowchart form.

A first non-limiting, example embodiment of the present invention is now described in conjunction with the power control routine illustrated in flowchart form FIG. 6. In this embodiment, the power control routine may be implemented in any type of radio transceiver, such as the base station and/or mobile station illustrated and described above, and may be used to control transmit power level in any direction, e.g., uplink and downlink. A detector, like either of the SIR detectors 74 and 100 in FIGS. 4 and 5, detects a signal quality parameter, such as signal-to-interference ratio (SIR) of a received signal from a controlled radio (block 100). The detected signal quality parameter may be adjusted by a processing entity, e.g., the transmit power controllers 72 and 98 in FIGS. 4 and 5, according to a most recently issued power command (block 102). The adjustment may be in accordance with the following:

$$SIR_{comp} \leftarrow SIR_{meas} + \Delta \times s$$

where $SIR_{comp}$ corresponds to the compensated SIR value, $SIR_{meas}$ corresponds to the measured SIR value, $\Delta$ is the incremental power increase or decrease value, and s corresponds to the most recent/latest power command. For a power up command, s=+1, and for a power down command, s=−1. A decision is made in block 104 whether the $SIR_{comp}$ value is less than an SIR target value. If so, a power up command is provided to the radio transmitter, and s is set to +1 (block 106). Otherwise, a power down command is provided to the radio transmitter, and the value of s is set to −1 (block 108). Thus, if the most recent power command indicates an incremental power increase, the $SIR_{meas}$ value is also incrementally increased to compensate for the time delay associated with the sending, receiving, and implementing of the most recent transmit power command. Conversely, if an incremental power down command was most recently sent, the measured SIR value is incrementally decreased.

Figure 7:
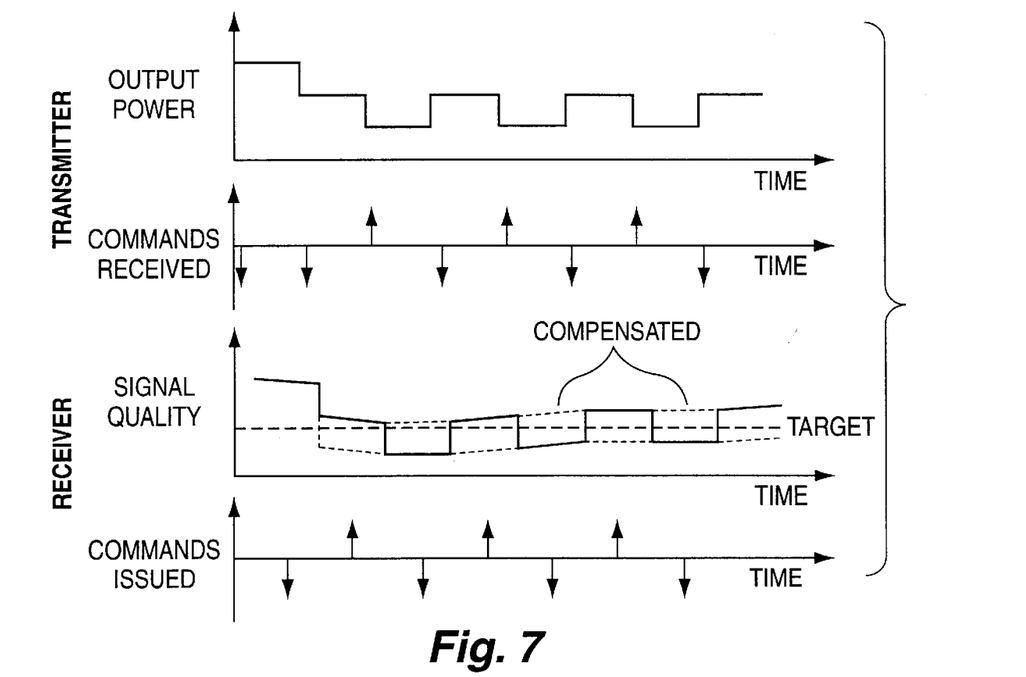
FIG. 7 illustrates power control command, signal quality, and output power signal graphs resulting from an example implementation of the embodiment as illustrated in FIG. 6.

The benefits of the power control algorithm illustrated in FIG. 6 are now described in conjunction with the signal diagrams shown in FIG. 7. The signal diagrams follow the format of FIGS. 1 and 2 described in the background but illustrate the benefits provided by the present invention compensating for power control loop delays. The compensated signal quality estimate ($SIR_{comp}$) is shown as the dashed curve obtained by adding to the measured SIR during one time slot the power control command issued in the preceding time slot, properly scaled with the step size $\Delta$. The power commands—issued and received—alternate every other command between power up and power down. As a result, both the output power transmit curve and the signal quality parameter curve are much closer to the target values with much smaller amplitude oscillation.

The radio station transmit power controller is provided with the incremental $\Delta$ power value and either has provided to it or otherwise determines the delay associated with the power control loop. The delay can be readily determined by simply adding $T_a$-$T_d$ from FIGS. 1 and 2, or it can be provided by some external entity. If there is little or no delay associated with the power control loop, one may dispense with the compensation of the signal quality measurement is desired.

It should be appreciated that this example is directed to the situation where the time delay associated with the power control loop is on the order of one power control sampling interval, e.g., a time slot, as defined by the communications protocol between the base and mobile stations. In other words, there is one signal quality parameter measurement and one transmit power command issued during each time slot whose effect has not yet been experienced. The invention also is applicable to situations where longer time delays result in more than one power command being issued whose effect is not yet experienced by the time the next signal quality measurement is taken. In such a case, the receiver tracks and compensates for all power control commands whose effect is not yet experienced. A more complex example embodiment such as those illustrated in FIG. 13 and FIG. 14 described below may be used in that situation.

In other cases, the signal parameter measured in the receiver may not be signal-to-interference ratio (SIR), but some other parameter such as carrier-to-interference ratio (CIR), received signal strength (RSSI), bit error rate (BER), etc. In addition, the power control commands may include different step sizes or may specify an explicit output power level directly. Furthermore, more sophisticated ways may be used to adjust the output power such as forming the output power as a weighted combination of the previous power and current power commands. Still further, if the transmitter is required to limit the output power to a certain range, this limitation can also be implemented so that the power control commands are only used to adjust the measured signal quality parameter if they result in a transmit power that lies within that allowed range. In another example variation, the adjustments may be based on the transmit powers to be used or which have already been used by the transmitter. While many variations and enhancements are possible, each predicts and compensates for the effect on one (or more) signal quality parameters measured in a receiver for power control commands that have been generated but not yet impacted the measured signal quality parameter.

Figure 8:
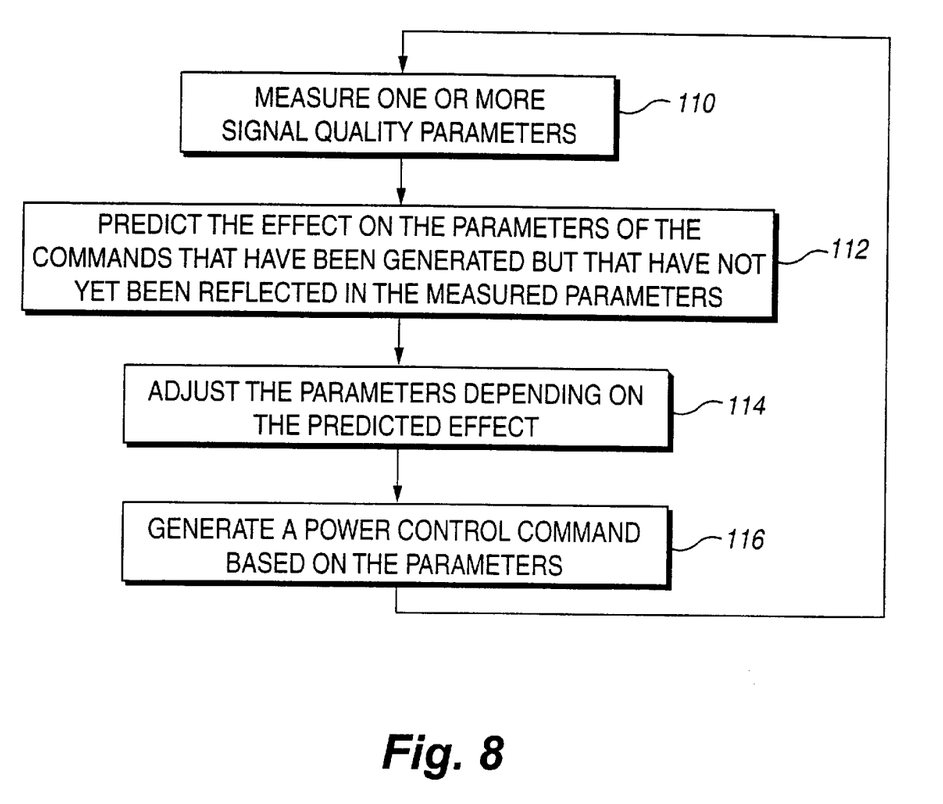
FIG. 8 illustrates a power control routine in accordance with another non-limiting, example embodiment of the present invention in flowchart form.

In this regard, another more general example embodiment of the present invention will now be described in conjunction with power control routine illustrated in flowchart format in FIG. 8. One or more signal quality parameters are measured by a signal quality detector such as the SIR detector 74 in the base station or the SIR detector 100 in the mobile station (block 110). A processing entity in either the base station or the mobile station, such as their respective transmit power controllers, predicts the effect on the measured one or more signal quality parameters of the power control commands that have been generated but that have not yet been reflected in the measured signal quality parameter (s) (block 112). The one or more signal quality parameters is then adjusted by the processing entity depending upon the predicted effect (block 114). A power control command is then generated based on the one or more adjusted signal quality parameters (block 116).

Accordingly, the present invention permits evaluation of the effect of one or more prior power control commands before the next power control command is issued. By keeping track of the pending power control commands that have issued but have not yet had full effect, the invention permits compensation of the measured signal quality parameter(s) in accordance with how each such signal quality parameter would be changed if the pending power control commands had already taken effect.

Figure 9:
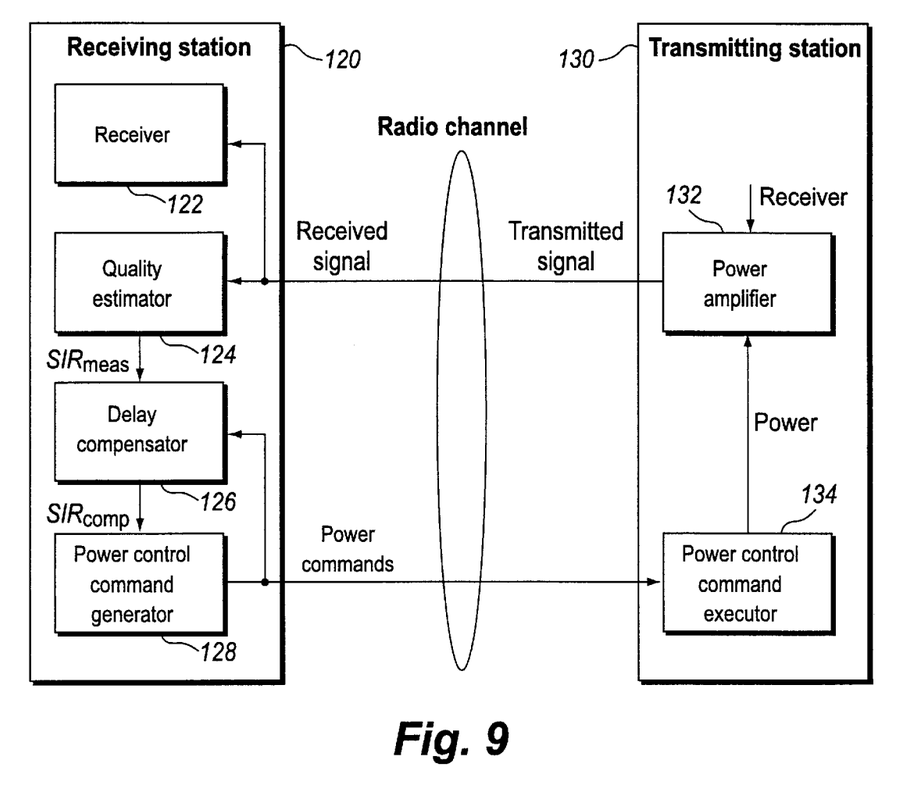
FIG. 9 illustrates an example, non-limiting embodiment of the invention in block diagram form.

The invention is further described by the example embodiment shown in block diagram form in FIG. 9 which shows a receiving station 120 communicating over a radio channel with a transmitting station 130. The received signal is detected in a receiver 122, and its signal quality is estimated in a quality estimator 124. The delay compensation may be implemented by a processing entity, here called a delay compensator 126, which acts on the measured signal quality $SIR_{meas}$ provided by the quality estimator 124 and produces a compensated signal quality $SIR_{comp}$ based on the previously generated power control commands from a power control command generator 128. The newly generated power command is determined based on $SIR_{comp}$ and sent to the transmitting station 130 as well as to the delay compensator 126. A power control command executing entity 134 in the transmitting station 130 responds to the received command by setting the power level of the power amplifier 132.

Figure 10:
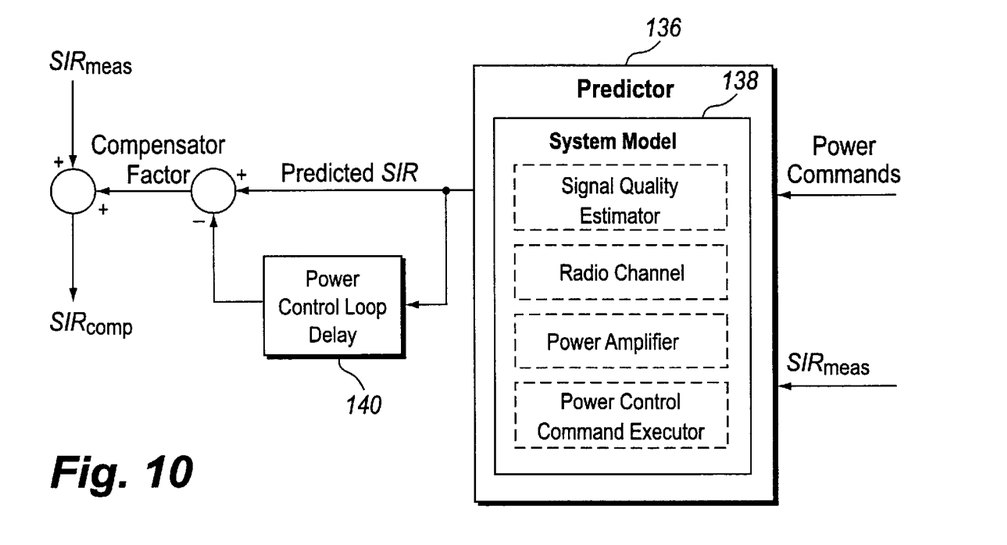
FIG. 10 illustrates a non-limiting, example embodiment for implementing delay compensation in accordance with the present invention.

FIG. 10 illustrates another example embodiment for implementing delay compensation in accordance with the invention. A processing entity, here called a predictor 136, predicts the effect of the generated power control commands on the power level of the transmitted signal output by the power amplifier of the transmitting station. That prediction may be determined using, for example, a power control system model which models various parameters that influence the power control loop. In this example, the signal quality estimator, the radio channel, the power amplifier, and the power control command executor shown in FIG. 9 are either individually modeled or some other way taken into account in the system model. Fewer or more system model characteristics may be considered. The predictor 136 could be implemented using hardware, software, or both, and as only one example, could employ a weighted digital filter operating on the measured SIR value $SIR_{meas}$. The predicted SIR output is then input to a differencer and to a power control loop time delay block 140. The delayed predicted $SIR_{meas}$ is subtracted from the non-delayed predicted $SIR_{meas}$ to form a compensation factor which is then added to the measured signal quality value $SIR_{meas}$ to form the compensated signal quality. The predictor 136 thus predicts how the actually measured signal quality would change if all generated power commands had already taken effect.

The invention is now described using mathematical-control theory terminology in conjunction with the control system type block diagrams shown in FIGS. 11–14.

The signal-to-interference ratio of signals received at a base station can be defined mathematically. Signal gains and power levels are expressed using a logarithmic scale, i.e., dB or dBm. Assume that m mobile stations are transmitting using the powers $p_i(t)$, i=1, ..., m. The signal between mobile station i and base station j is attenuated by the signal gain $g_{ij}(t)$, where $g_{ij}(t)<0$. Thus, the corresponding connected base station receives a desired carrier signal power level $C_i(t)=p_i(t)+g_{ii}(t)$ and an interference plus noise $I_i(t)$ (values in logarithmic scale). The signal-to-interference ratio $\gamma(t)$ at base station i is defined by $$\gamma i(t)=p_i(t)+g_{ii}(t)-I_i(t). \tag{1}$$

The stepwise incremental power control scheme described above can be represented using logarithmic values as $$e_i(t)=\gamma_{tgt,i}(t)-\gamma_i(t) \tag{2}$$

$$s_i(t)=sgn(e_i(t)) \tag{3}$$

$$p_i(t+1+n_p)=p_i(t+n_p)+\Delta \cdot s_i(t), \tag{4}$$

where $\gamma_{igt,i}(t)$ is the current threshold SIR value, $e_i(t)$ is the SIR error, $s_i(t)$ is the transmit power control command at time instant t, $\Delta$ is the incremental power step size (how much power may be increased or decreased at a time), $n_p$ is the time delay associated with transmit power the control command, and $p_i$ is the transmit power.

Figure 11:
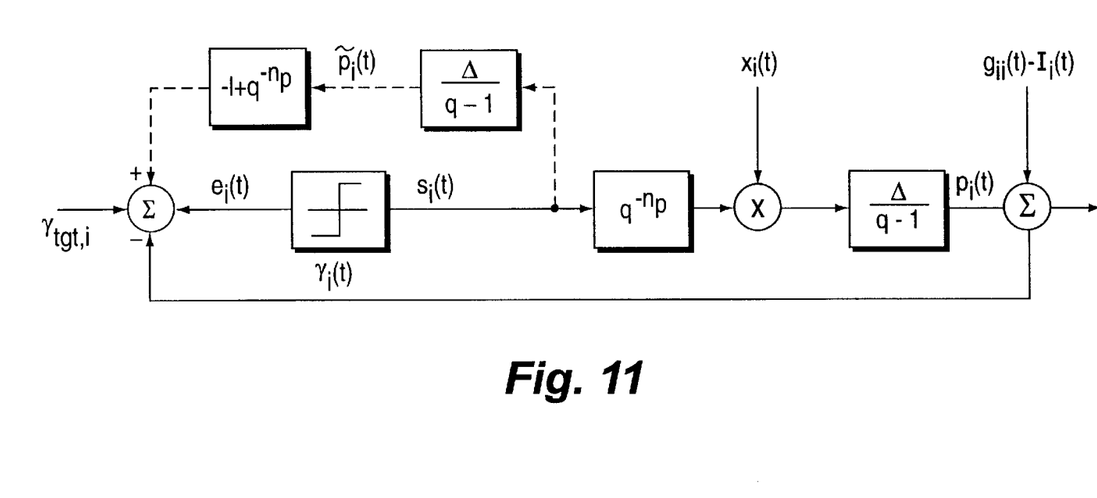
FIGS. 11–14 illustrate, using mathematical notational function blocks, power control loops in accordance with various non-limiting, example embodiments of the present invention.

Focusing on one receiver-transmitter pair, the algorithm can be depicted as in FIG. 11. The external signal $x_i(t)$ represents transmission errors of commands. Time delay compensation is implemented using the transmit power control command to compute the powers to be used by the transmitter. The dashed line feedback loop corresponds to the power control loop time delay compensation. These computed transmit powers are used to modify the measurement of the SIR resulting in the following algorithm on the receiver side $$e_i(t)=\gamma_{tgt,i}(t)-\gamma_i(t)-\tilde{p}_i(t)-\tilde{p}_i(t-n_p) \tag{5}$$

$$s_i(t)=sgn(e_i(t)) \tag{6}$$

$$\tilde{p}_i(t+1)=\tilde{p}_i(t)+\Delta \cdot s_i(t), \tag{7}$$

where $\tilde{p}_i(t)$ is the computed transmit power.

A carrier strength (C) based increase/decrease control approach is implemented much the same way except for the choice of signal quality measurement signal. This scheme can be described by $$e_i(t)=C_{tgt,i}(t)-C_i(t) \tag{8}$$

$$s_i(t)=sgn(e_i(t)) \tag{9}$$

$$p_i(t+1+n_p)=p_i(t+n_p)+\Delta \cdot s_i(t), \tag{10}$$

where $C_{tgt,i}(t)$ is the current signal quality threshold value based on carrier signal strength. Time delay compensation is implemented analogously as $$e_i(t)-C_{tgt,i}(t)-C_i(t)-\tilde{p}_i(t)+\tilde{p}_i(t-n_p) \tag{11}$$

$$s_i(t)=sgn(e_i(t)) \tag{12}$$

$$\tilde{p}_i(t+1)=\tilde{p}_i(t)+\Delta \cdot s_i. \tag{13}$$

Figure 12:
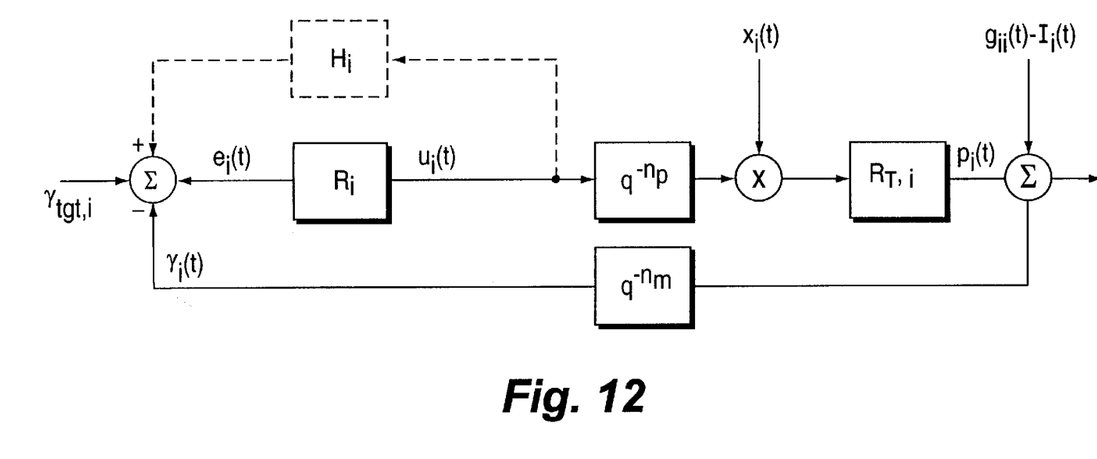

Referring now to FIG. 12, rather than using only one bit for signaling the transmit power level command, symbols $u_i(t)$ may be used that include more than one bit for command signals. These symbols are decoded at the transmitter by a device $R_{T,i}$. Furthermore, assume that the command signals are delayed by $n_p$ samples, the signal quality measurements by $n_m$ samples, and $H_i$ represents the time delay compensation adjustment based on the issued transmit power level command symbols. In this case, $$H_i=(-1+q^{-n_p-n_m})R_{T,i}. \tag{14}$$

The external signal $x_i(t)$ represents errors in transmission of the symbols. Time delay compensation is implemented via the dashed lines.

In an SIR-balancing control approach, where the goal is to provide all receivers with the same SIR, the actual transmit power level to be used is signaled to the transmitter. It will be exemplified by four important algorithm structures.

An I-controller is given by:

$$p_i(t+1)=p_i(t)+\beta(\gamma_{tgt,i}(t)-\gamma_i(t)) \tag{15}$$

of which several popular algorithms are special cases. For instance, the DPC algorithm is given by $\beta=1$ and values in linear scale. The I-controller can be described by $$p_i(t) = \frac{\beta}{q-1}e_i(t) = R(q)e_i(t), \tag{16}$$

where $e_i(t)=\gamma_{tgt,i}(t)-\gamma_i(t)$, and the delay operator q is defined by $$qp_i(t)=p_i(t+1). \tag{17}$$

A PI-controller is given by:

$$e_i(t)=(\gamma_{tgt,i}(t)-\gamma_i(t)) \tag{18}$$

$$x_i(t+1)=x_i(t)+K_i e_i(t) \tag{19}$$

$$p_i(t+1)=K_p e_i(t)+x_i(t+1), \tag{20}$$

where $x(t)$ is the integration state, and $K_p$ and $K_i$ are parameters. The algorithm can be written as:

$$p_i(t) = \frac{K_p q + (K_i - K_p)}{q-1}e_i(t) = R(q)e_i(t). \tag{21}$$

Another proposed algorithm is given by:

$$p_i(t+1)=\alpha-\beta(\gamma_i(t)-p_i(t)). \tag{22}$$

By defining $\alpha/\beta=\gamma_{tgt}$, this can be reformulated as:

$$p_i(t+1)=\beta p_i(t)+\beta(\gamma_{tgt}-\gamma_i(t)) \tag{23}$$

With the q operator, the following is obtained:

$$p_i(t) = \frac{\beta}{q-\beta}e_i(t) = R(q)e_i(t) \tag{24}$$

Figure 13:
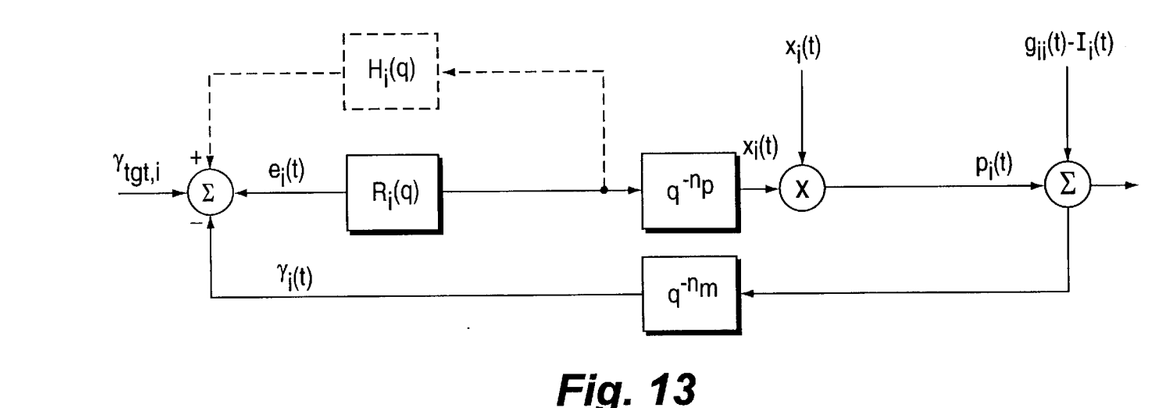

All of these algorithms can be depicted as in FIG. 13, where the transmit powers are assumed to be delayed by $n_p$ samples and the measurements by $n_m$ samples. Time delay compensation is implemented by selecting the propriate $H_i(q)$. In these cases, $$H(q)=(-1+q^{-n_p-n_m}) \qquad (25)$$

Figure 14:
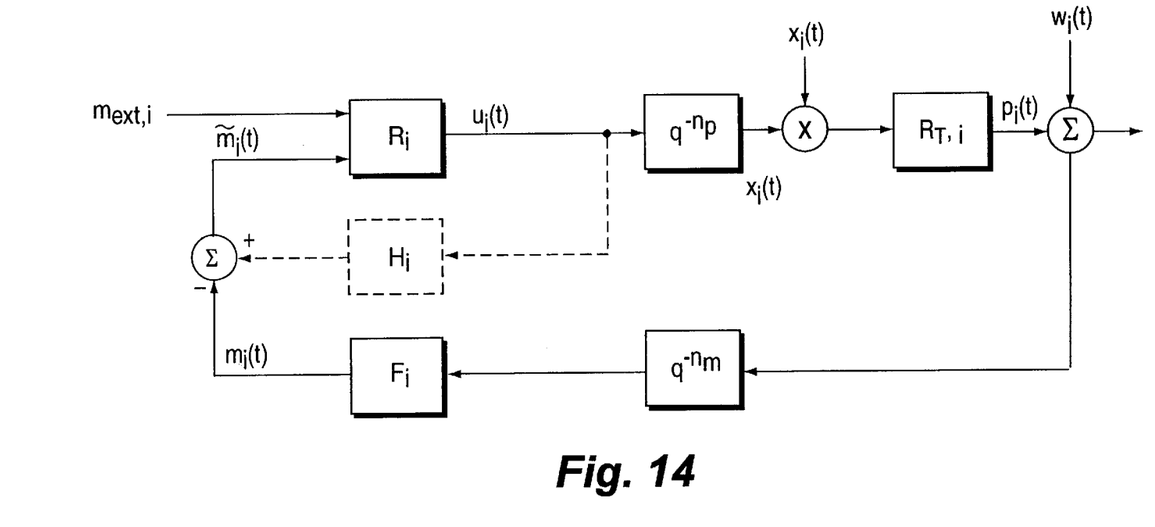

FIG. 14 describes a general power control algorithm. Let index i indicate receiver-transmitter pairs corresponding to user i. Consider a general power control algorithm $R_i$, which based on measurements $m_i(t)$ and possibly an external input $m_{ext,i}(t)$ computes power update commands $u_i(t)$. The measurements $m_i(t)$ comprises SIR and/or received carrier power. These update commands are decoded in the transmitter by the device $R_{T,i}$. The raw measurements are processed by the device $F_i$ which is assumed to be additive and time-invariant. These properties are illustrated below in equations (26) and (27) respectively:

$$F\{x(t)+y(t)\}=F\{x(t)\}+F\{y(t)\} \qquad (26)$$

$$F\{q^{-n}x(t)\}=q^{-n}F\{x(t)\} \qquad (27)$$

Then time delay compensation is implemented by adjusting the measurements as $$\tilde{m}_i(t) = m_i(t) - H_i u_i(t) \qquad (28)$$

$$= m_i(t) - (-1 + q^{-n_p-n_m})F_i\{R_{T,i}u_i(t)\}$$

Interesting specific applications include the following. (1) The measurement processing device might comprise of a linear filter $F_i(q)$ to smooth the measurements. In a different situation, it might describe the measurement process, e.g., $F_i(q)=\alpha+(1-\alpha)q^{-1}$ to describe that the measurement is affected by two consecutive output powers of the transmitter. (2) In SIR-based increase/decrease control, the measurement $m_i(t)$ is equal to SIR ($\gamma_i(t)$), and consequently, $w_i(t)=g_{ii}(t)-I_i(t)$. The command signal is computed by $$u_i(t)=sgn(\gamma_{tgt,1}-\gamma_i(t)). \qquad (29)$$

(3) The power control command decoder $R_{T,i}$ is given by $$R_{T,i}(q) = \frac{\Delta}{q-1} \qquad (30)$$

where $\Delta$ is the step size. Hence, this results in the time delay compensation $$\tilde{\gamma}_i(t) = \gamma_i(t) - H_i u_i(t) \qquad (31)$$

$$= \gamma_i(t) - (-1 + q^{-n_p-n_m})F_i(q)\frac{\Delta}{q-1}u_i(t).$$

In the case $F_i(q)=1$ the implementation given by equations (5), (6), and (7) is obtained. (4) In carrier signal strength based increase/decrease control, the measurement $m_i(t)$ is equal to the received carrier power ($C_i(t)$), $w_i(t)=g_{ii}(t)$ with analogy to SIR-based increase/decrease control described above. (5) Assume that the measurement $m_i(t)$ is either SIR or the received carrier power, and $w_i(t)$ is equal to $g_{ii}(t)=I_i(t)$ or $w_i(t)=g_{ii}(t)$, respectively. Furthermore, assume that the actual power transmitted is $R_{T,i}=1$ and $u_i(t)=p_i(t)$. The linear power control algorithm $R_i(q)$ is assumed to operate on the error signal $$e_i(t)=m_{tgt,i}-\tilde{m}_i(t) \qquad (32)$$

Time delay compensation is thus implemented as $$\tilde{m}_i(t) = m_i(t) - H_i p_i(t) - \qquad (33)$$

$$= m_i(t) - (-1 + q^{-n_p-n_m})F_i\{R_i(q)\}p_i(t)$$

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed:

1. A method for use in controlling a transmit power of a radio transmitter, comprising:
    determining a signal-to-interference ratio (SIR) of a signal received from the transmitter;
    determining an SIR adjustment using one or more previously-transmitted power commands;
    adjusting the determined SIR using the SIR adjustment; and
    generating a power control command using the adjusted SIR.

2. The method in claim 1, wherein the SIR adjustment is determined using the one or more previously transmitted power commands and an incremental transmit power.

3. The method in claim 2, wherein the incremental transmit power may be negative or positive.

4. The method in claim 2, wherein the adjusted SIR equals a measured SIR added to a product of an incremental power increase or decrease value and a sign of a most recent transmit power command.

5. The method in claim 4, wherein the incremental value is a fixed constant or a variable.

6. The method in claim 1, further comprising:
    comparing the adjusted SIR to a target SIR,
    wherein the power control command is generated in response to the comparison.

7. The method in claim 1, wherein if the adjusted SIR exceeds the target SIR, the generated power control command directs a decrease in transmit power.

8. The method in claim 1, wherein if the adjusted SIR is less than the target SIR, the generated power control command directs an increase in transmit power.

9. The method in claim 1, wherein the SIR adjustment compensates for a time delay associated with controlling the transmit power of the radio transmitter.

10. The method in claim 9, wherein as a delay associated with the power control command decreases, a number of power control commands used to determine the SIR adjustment decreases, and as a delay associated with the power control command increases, the number of power control commands used to determine the SIR adjustment increases.

11. The method in claim 1 implemented in a base station used to control a transmit power level of the radio transmitter in a mobile station.

12. The method in claim 1 implemented in a mobile station used to control a transmit power level of the radio transmitter in a base station.

13. Apparatus for use in controlling a transmit power of a radio transmitter, comprising:
    means for determining a signal-to-interference ratio (SIR) of a signal received from the transmitter;
    means for determining an SIR adjustment using one or more previously-transmitted power commands;

means for adjusting the determined SIR using the SIR adjustment; and means for generating a power control command using the adjusted SIR.

14. The apparatus in claim 13, wherein the SIR adjustment is determined using the one or more previously transmitted power commands and an incremental transmit power.

15. The apparatus in claim 14, wherein the incremental transmit power may be negative or positive.

16. The apparatus in claim 14, wherein the adjusted SIR equals a measured SIR added to a product of an incremental power increase or decrease value and a sign of a most recent transmit power command.

17. The apparatus in claim 16, wherein the incremental value is a fixed constant or a variable.

18. The apparatus in claim 13, further comprising:
comparing the adjusted SIR to a target SIR,
wherein the power control command is generated in response to the comparison.

19. The apparatus in claim 13, wherein the SIR adjustment compensates for a time delay associated with controlling the transmit power of the radio transmitter.

20. The apparatus in claim 19, wherein as a delay associated with the power control command decreases, a number of power control commands used to determine the SIR adjustment decreases, and as a delay associated with the power control command increases, the number of power control commands used to determine the SIR adjustment increases.

21. A radio station for use in a mobile radio communications system, comprising:
a radio transmitter for transmitting power control commands to another radio station;
a radio receiver for receiving a signal transmitted by the other radio station;
a detector for detecting a signal-to-interference (SIR) associated with the received signal;
a processor configured to:
predict an effect of a power control command on the detected SIR assuming the power control command had already taken effect,
adjust the detected SIR using the predicted effect, and
generate a transmit power control command taking into account the predicted effect,
wherein the prediction and the adjustment compensate for a time delay associated with controlling the transmit power of the radio transmitter.

22. The radio station in claim 21, wherein the processor is configured to predict the effect plural power control commands would have assuming plural power control commands had already been received and implemented in the transmitter.

23. The radio station in claim 21, wherein the generated power control command includes a first command for increasing the transmit power level by an incremental value and a second command for decreasing the transmit power level by an incremental value.

24. The radio station in claim 23, wherein the incremental value is a fixed constant.

25. The radio station in claim 23, wherein the incremental value is a variable.

26. A radio station for use in a mobile radio communications system, comprising:
a radio transmitter for transmitting power control commands to another radio station;
a radio receiver for receiving a signal transmitted by the other radio station;
a detector for detecting a signal-to-interference (SIR) associated with the received signal;
a processor configured to:
predict an effect of a power control command on the detected SIR assuming the power control command had already taken effect,
generate a transmit power control command taking into account the predicted effect, and
adjust the detected SIR using a prior SIR, a previously-transmitted power command, and an incremental transmit power.

27. The radio station in claim 21, wherein the generated power control command includes a new transmit power level value.

28. The radio station in claim 21, wherein if the adjusted SIR exceeds the target SIR, the generated power control command directs a decrease in transmit power.

29. The radio station in claim 21, wherein if the adjusted SIR is less than the target SIR, the generated power control command directs an increase in transmit power.

30. A radio station for use in a mobile radio communications system, comprising:
a radio transmitter for transmitting power control commands to another radio station;
a radio receiver for receiving a signal transmitted by the other radio station;
a detector for detecting a signal-to-interference (SIR) associated with the received signal;
a processor configured to:
predict an effect of a power control command on the detected SIR assuming the power control command had already taken effect,
generate a transmit power control command taking into account the predicted effect, and
adjust the detected SIR using the predicted effect and wherein the generated power control command is generated based on the adjusted SIR,
wherein as a delay associated with the power control command decreases, a number of power control commands used to determine the adjusted SIR decreases, and as a delay associated with the power control command increases, the number of power control commands used to determine the adjusted SIR increases.

31. The radio station in claim 21, wherein the radio station is a base station and the other radio station is a mobile station.

32. The radio station in claim 21, wherein the radio station is a mobile station and the other radio station is a base station.

33. The radio station in claim 21, wherein the prediction of the effect of the power control commands accounts for limitations to transmit output power of the other radio station.

34. Amended) A method for use in a mobile radio communications system, comprising:
transmitting from a first radio station to a second radio station power control commands;
receiving a signal transmitted by the second radio station;
detecting a signal-to-interference (SIR) associated with the received signal;
predicting an effect of the transmitted power control command on the detected SIR assuming the transmitted power control command had already taken effect;
adjusting the detected SIR using the predicted effects, and
generating the power control command taking into account the predicted effect, wherein the prediction and the adjustment compensate for a time delay associated with controlling the transmit power of the radio transmitter.

35. The method in claim 34 further comprising:
predicting the effect plural power control commands would have assuming plural power control commands had already been received and implemented in the transmitter.

36. A radio station for sending information over a radio channel in a mobile radio communications system, comprising:
- a radio transmitter for transmitting power control commands to another radio station;
- a radio receiver for receiving a signal transmitted by the other radio station;
- a detector for detecting a signal-to-interference (SIR) associated with the received signal;
- a predictor for predicting an SIR of a future received signal including a power control model for modeling parameters that influence a power control process and for generating a predicted SIR;
- a delay for delaying the predicted SIR and providing a delayed predicted SIR;
- a differencer for determining a difference between the predicted SIR and the delayed SIR;
- a first summer for summing the difference with the predicted SIR to produce an SIR compensation factor;
- a second summer for summing the SIR compensation factor with the detected SIR to produce a compensated SIR; and
- a power control command generator for generating a power control command using the compensated SIR.

37. The radio station in claim 36, wherein the predictor is a digital filter.

38. The radio station in claim 36, wherein the predictor is configured to model the SIR detector, a radio channel, and the power control command generator.

39. The radio station in claim 36, wherein the other radio station determines its transmission power based on the received power control command.

40. A method for sending information over a radio channel in a mobile radio communications system, comprising:
transmitting power control commands from a first radio station to a second radio station;
receiving a signal transmitted by the second radio station;
detecting a signal-to-interference (SIR) associated with the received signal;
predicting an SIR of a future received signal including a power control model for modeling parameters that influence a power control process and for generating a predicted SIR;
delaying the predicted SIR and providing a delayed predicted SIR;
determining a difference between the predicted SIR and the delayed SIR;
summing the difference with the predicted SIR to produce an SIR compensation factor;
summing the SIR compensation factor with the detected SIR to produce a compensated SIR; and
generating a power control command using the compensated SIR.

41. The method in claim 40, wherein the predicting includes modeling the SIR detector, a radio channel, and the power control command generator.

42. The method in claim 40, wherein the second radio station determines its transmission power based on the received power control command.

* * * * *